United States Patent [19]

Fukuda

[11] Patent Number: 5,465,126
[45] Date of Patent: Nov. 7, 1995

[54] FOCUSING LENS HOLDING MECHANISM USED IN OPTICAL SYSTEM

[75] Inventor: Hideo Fukuda, Nishinomiya, Japan

[73] Assignee: Mita Industrial Co., Ltd., Osaka, Japan

[21] Appl. No.: 957,361

[22] Filed: Oct. 7, 1992

[30] Foreign Application Priority Data

Oct. 25, 1991 [JP] Japan ................................ 3-279815

[51] Int. Cl.$^6$ .................................................... G02B 7/02
[52] U.S. Cl. ........................... 353/101; 359/811; 359/813; 359/819
[58] Field of Search .................... 353/101, 100; 359/811, 813, 815, 819, 829; 355/235, 44, 55; 369/44.15, 44.16

[56] References Cited

U.S. PATENT DOCUMENTS

| | | | |
|---|---|---|---|
| 2,968,217 | 1/1961 | Ewald | 353/101 |
| 3,301,129 | 1/1967 | Henriksen | 353/101 |
| 4,183,636 | 1/1980 | Besenmatter et al. | 353/101 |
| 4,655,548 | 4/1987 | Jue | 359/811 |
| 5,194,993 | 3/1993 | Bedzyk | 359/813 |

*Primary Examiner*—William A. Cuchlinski, Jr.
*Assistant Examiner*—William C. Dowling
*Attorney, Agent, or Firm*—Cushman Darby & Cushman

[57] ABSTRACT

A focusing lens 24 is held with a holder 27. A mounting plate 28, and a coupling plate 29 are provided between the holder 27 and the base member 26 of an optical system 10. In one of three combinations of the holder 27 and the mounting plate 28, the latter 28 and the coupling plate 29, and the latter 29 and the base member 26, those forming the combination are set in such a manner as to be movable relative to each other for adjustment of the length of an optical path of the focusing lens; in another of the three combinations, those forming the combination are set in such a manner that the components are movable relative to each other for adjustment of the optical axis of the focusing lens; and in the remaining combination, those forming the remaining combination are fixed in such a manner as to be movable relative to each other for adjustment of the resolving power balance of the focusing lens.

8 Claims, 4 Drawing Sheets

FOCUSING LENS HOLDING MECHANISM USED IN OPTICAL SYSTEM

BACKGROUND OF THE INVENTION

1. Field of the Invention

This invention relates to a mechanism for holding a focusing lens in an optical system (hereinafter referred to as "a focusing lens holding mechanism" or "a holding mechanism", when applicable), and more particularly to a focusing lens holding mechanism in an image forming apparatus such as a copying machine which is adapted to form the image of an original as a latent image on the surface of a photo-sensitive member.

2. Description of Conventional Art

In general, an image forming apparatus operates as follows: The image of an original focused by the optical system is applied to a photo-sensitive member, so that its electrostatic latent image is formed thereon. The latent image is developed into a toner image by the developing unit, and the toner image is transferred onto a printing paper. There have been proposed a variety of image forming apparatuses in the art (cf. Examined Japanese Patent Publication (Kokoku) Hei-2-17453/(1990).

The optical system in the image forming apparatus comprises: a light source for irradiating an original; and a focusing lens for leading light reflected from the original thus irradiated to a photo-sensitive member so as to form the image of the original thereon.

In installation of the focusing lens, it is essential to perform the following three adjusting operations: In the first adjusting operation, in order to adjust the focal length of the focusing lens, the length of the optical path is adjusted. In the second adjusting operation, in order to eliminate the inclination of the image focused on the photo-sensitive member by the focusing lens, the resolving-power balance is adjusted. In the third adjusting operation, in order to align the optical axis of the focusing lens with the paper conveying reference axis of a paper conveying section, the optical axis is adjusted.

There has been available a focusing lens holding mechanism with which the above-described adjusting operations can be achieved. The holding mechanism is designed as shown in FIG. 3. That is, a focusing lens 31 is held with a holder 32. The holder 32 has a mounting part, which is mounted on the lower surface of a base member 33 set over a photo-sensitive drum (not shown). The mounting part of the holder 32 has a pair of screw holes j at both ends, respectively. More specifically, the screw holes j are positioned on both sides of the optical axis of the focusing lens 31, respectively. Screws m are threadably engaged with the screw holes j from above the base member 33, so that the focusing lens 31 is fixedly mounted on the base member 33 through the holder 32. In order to threadably engage the screws m with the screw holes j, a pair of slots n are formed in the base member 33 in such a manner that they are in parallel with each other and the optical axis P1 of an optical system (not shown) is at the middle of the distance between them.

With the mechanism thus constructed, the length of the optical path of the focusing lens 31 is adjusted by changing the position of the holder 32 in the range defined by the length of the slots n. Furthermore, the resolving power balance and the optical axis are adjusted by changing the position of the holder 32 in the range defined by the clearances between the slots n and the screws m.

As was described above, in the case of the conventional mechanism, the resolving power balance and the optical axis are adjusted by changing the position of the holder 32 in the range defined by the clearances between the elongated holes n and the screws m. Hence, it is impossible to perform the adjusting operations separately, and therefore it is essential to manufacture the components with severe tolerances (for instance ±0.05 to 0.40 mm). Therefore, the components are low in yield rate when manufactured, and accordingly high in manufacturing cost.

Furthermore, the above-described holding mechanism may be applied to a so-called "clamshell type image forming apparatus" in which the upper unit is coupled to the lower unit in such a manner that the former is swingable with respect to the latter. In this case, the optical system is mounted, as an additional unit, on the photo-sensitive member. Therefore, if the coupling of the upper and lower units is low in accuracy, then after the optical system has been installed, its resolving power balance may be changed, or the optical axis may be shifted. In this case, the following difficulties will occur because, with the conventional holding mechanism, the adjusting operations cannot be performed separately. That is, even in the case where it is required to adjust the resolving power balance only or the optical axis only, it is necessary to disassemble the optical system and reassemble it while adjusting the resolving power balance and the optical axis again. Thus, once the optical system is installed, it is rather difficult to perform the adjusting operations for it again.

SUMMARY OF THE INVENTION

In view of the above-described difficulties, an object of this invention is to provide a focusing lens holding mechanism in an optical system which is simple in construction and allows for a low manufacturing accuracy, so that the manufacturing cost can be reduced. Further, even after installed, the optical system can be readily adjusted again.

The foregoing object of the invention has been achieved by the provision of a focusing lens holding mechanism in an optical system; which, according to the invention comprises: a holder for holding a focusing lens arranged on the optical axis of the optical system; a mounting plate on which the holder is mounted; and a coupling plate through which the mounting plate is coupled to a base member of said optical system, and in which, in one of three combinations of the holder and the mounting plate, the mounting plate and the coupling plate, and the coupling plate and the base member, those forming the combination are set in such a manner as to be movable relative to each other for adjustment of the length of an optical path of the focusing lens, in another of the three combinations, those forming the combination are set in such a manner that the components are movable relative to each other for adjustment of the optical axis of the focusing lens, and in the remaining combination, those forming the remaining combination are fixed in such a manner as to be movable relative to each other for adjustment of the resolving power balance of the focusing lens.

With the holding mechanism of the invention, in one of the steps of fixedly mounting the holder on the mounting plate, the mounting plate on the coupling plate, and the coupling plate on the base member of the optical system, the length of the optical length of the focusing lens can be adjusted, and in another of the steps, the optical axis can be adjusted, and in the remaining step, the resolving power balance can be adjusted. That is, those adjusting operations can be achieved independently of one another.

DETAILED DESCRIPTION OF PREFERRED EMBODIMENT

One preferred embodiment of this invention will be described with reference to the accompanying drawings.

Figure 2:
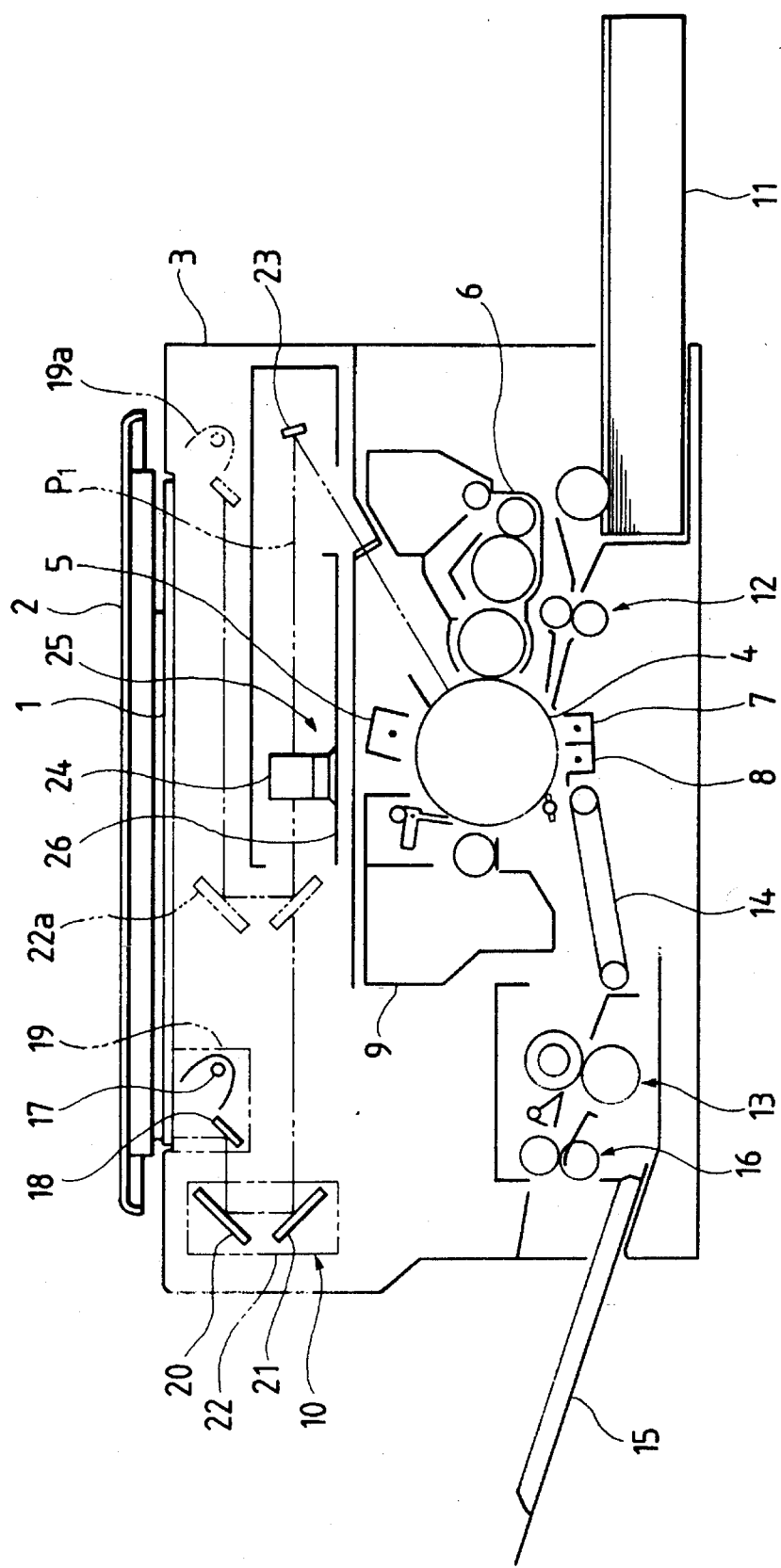
FIG. 2 is a sectional view showing the arrangement of a copying machine, which is one example of an image forming apparatus with the focusing lens holding mechanism according to the invention.
Figure 3:
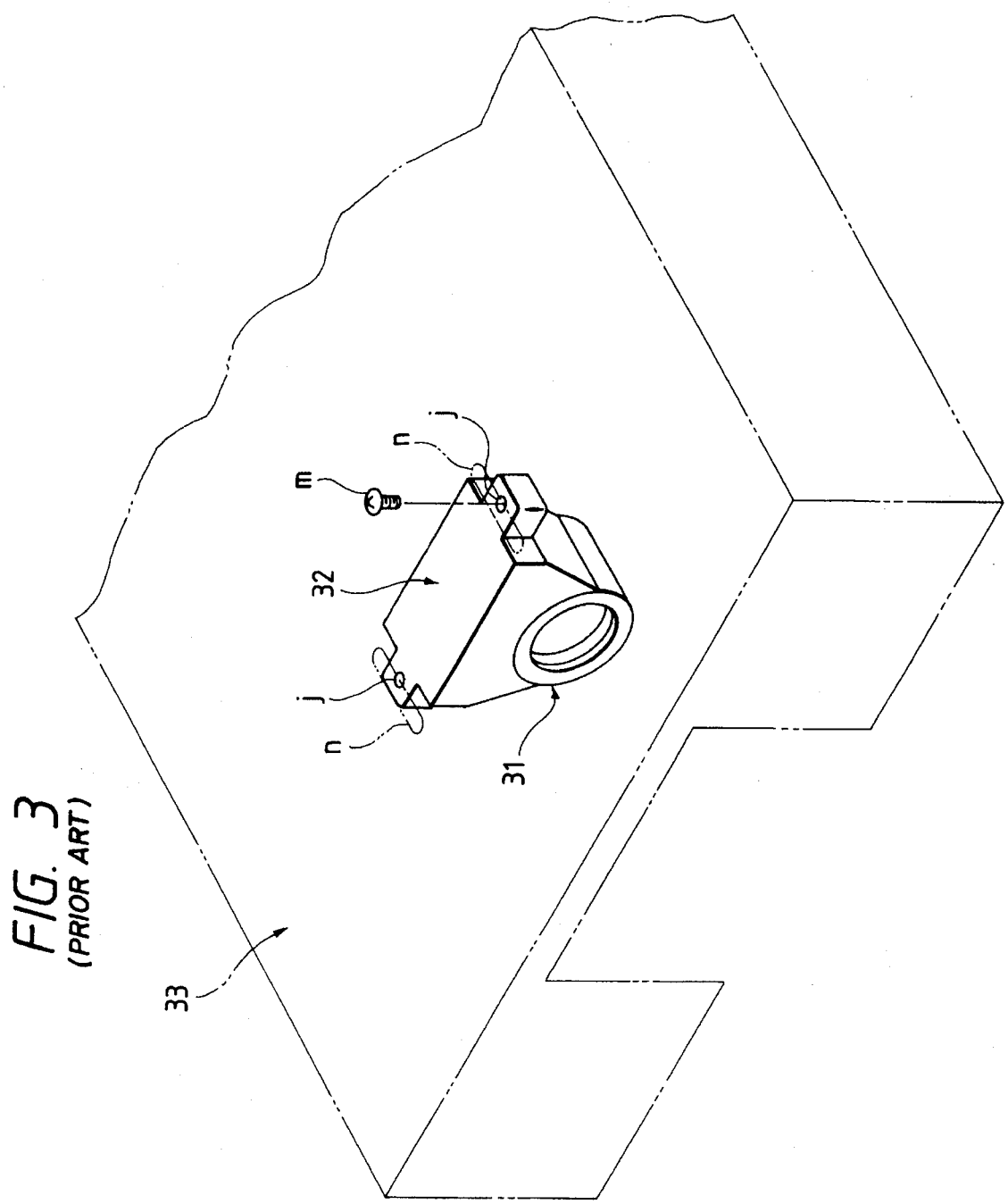
FIG. 3 is a perspective view showing a conventional focusing lens holding mechanism in an optical system.

FIG. 2 is a vertical sectional view outlining the arrangement of an electrostatic photocopying machine which is an example of an image forming apparatus.

As shown in FIG. 2, the machine has a machine body 3 including an original platen 1 and an original retainer 2. A paper supplying cassette 11 and a tray 15 are detachably mounted on both ends of the machine body 3, respectively. A photo-sensitive drum 4 is held horizontal inside the body 3. A charging unit 5, a developing unit 6, a transferring unit 7, a sheet separating unit 8, and a cleaning unit 9 are set around the photo-sensitive drum 4. Further provided inside the machine body 3 are a paper conveying unit 12 for conveying a paper from the paper supplying cassette 11, a paper conveying unit 14 for conveying the paper, on which an image has been transferred by the transferring unit, to a fixing unit 13, and a pair of paper discharging rollers 16 for conveying the paper, on which an image has been fixed, to the tray 15.

Inside the body 3, an optical system 10 is provided below the original platen 1. The optical system 10 has a first optical moving unit 19 and a second optical moving unit 22. Those optical moving units 19 and 22 are designed so that they are reciprocated by conventional drive means (not shown) to scan the original.

The first optical moving unit 19 comprises: a light source 17 for irradiating an original on the original stand 1; and a first mirror 18 for reflecting towards the second optical moving unit 22 light reflected from the original. The second optical moving unit 22 comprises: second and third mirrors 20 and 21 for leading the light reflected by the first mirror 18 to the photo-sensitive drum 4 by reflecting it. By setting the speed of movement of the first optical moving unit 19 to a predetermined value with respect to the speed of movement of the second optical moving unit 22, the magnification of the latent image formed on the surface of the photo-sensitive drum 4 and of the image of the original can be determined. In the case where it is required to form the image of the original on the surface of the photo-sensitive drum at equi-magnification, the first optical moving unit 19 is moved twice as fast as the second optical moving unit 22 (cf. the two-dot chain lines 19a and 22a in FIG. 2).

In order to apply the light reflected from the third mirror 21 to the surface of the photo-sensitive drum 4, a stationary mirror 23 is set in the machine body 3 in such a manner that it is confronted with the second optical moving unit 22. A focusing lens 24 is provided in the optical path between the stationary mirror 13 and the third mirror 21. The focusing lens 24 is fixedly mounted on the base member 26 of the optical system 10 with a holding mechanism 25 in such a manner that the center of the focusing lens 24 is on the optical axis P1 of the optical system 10, so that the image of the original is formed on the surface of the photo-sensitive drum 4 at equi-magnification.

Figure 1A:
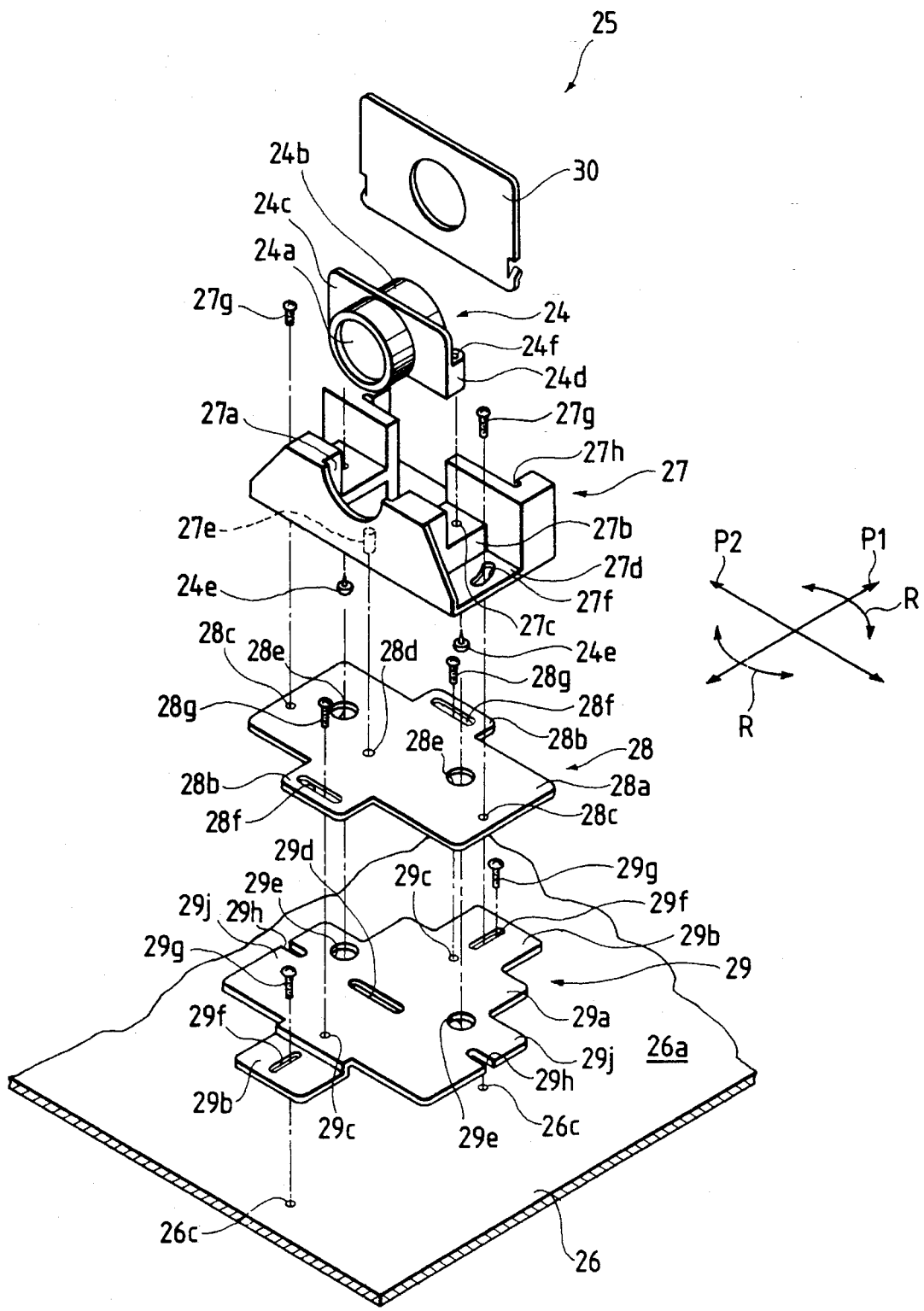
FIGS. 1A and 1B are exploded perspective view showing a focusing lens holding mechanism in an optical system, which constitutes one embodiment of this invention.

FIG. 1A is an exploded perspective view of the above-described focusing lens holding mechanism 25. The mechanism 25, as shown in FIG. 1A, comprises: a holder 27 for holding the focusing lens 24; a mounting plate 28 mounted on the lower surface of the holder 27; and a coupling plate 29 through which the mounting plate 28 is coupled to the base member 26 of the optical system 10 described above.

The focusing lens 24 comprises: a cylinder 24b for holding a lens part 24a; and a rectangular plate-shaped stationary part 24c which is extended from the middle of the cylinder 24b radially outwardly of the lens part 24a. The plate-shaped stationary part 24c has a pair of legs 24d extended vertically like ribs. The legs 24d have threaded through-holes 24f, with which tapping screws 24e are engaged.

The holder 27 is, for instance, of resin, which is formed by extrusion molding. The holder 27 comprises: a mount 27a which is opened semi-circular to mount the cylinder 24b of the focusing lens 24 in such a manner that the optical axis of the focusing lens 24 is in parallel with the optical axis P1 of the optical system 10; and leg placing parts 27b on which the aforementioned legs 24d are placed. The leg placing parts 27b have through-holes 27c, through which the tapping screws 24e are threadably engaged with the threaded through-holes 24f in the legs 24d. The mount 27a is coupled to the leg placing parts 27b through a bottom plate 27d. A pin 27e is extended from the lower surface of the bottom plate 27d vertically towards the photo-sensitive drum 4 (FIG. 2). A pair of arcuate holes 27f are formed in both end portions of the bottom plate in such a manner that they have the center at the pin 27e; more specifically, the arcuate holes are extended in the direction of rotation R of the bottom plate around the pin 27e. The arcuate holes 27f are used as follows: Screws 27g for securing the holder 27 to the mounting plate 28 are extended through the arcuate holes 27f towards the mounting plate 28 with a movable range in the direction of rotation R. In order to prevent the flare of the focusing lens 24, a part of the holder 27 is formed into a mounting part 27h on which a filter plate 30 of is detachably mounted.

The above-described mounting plate 28 is a steel plate formed by pressing. More specifically, the mounting plate 28 includes a base plate 28a, and two protruded portions 28b extended respectively from both edges of the base plate 28a along the optical axis P1. The base plate 28a has screw holes 28c with which the screws 27g are threadably engaged, an insertion hole 28d into which the pin 27e is rotatably inserted, and through-holes 28e for preventing the interference of the heads of the tapping screws 24e with the mounting plate 28. With the pin 27e inserted in the insertion hole 28d, the holder 27 is mounted on the mounting plate 28, and the screws 27g are inserted into the arcuate holes 27f and threadably engaged with the screw holes 28c. Thus, with the aid of the movable range between the arcuate holes 27f and the screws 27g, the holder 27 is mounted on the mounting plate 28 in such a manner that it is movable in the directions of the arrows R to adjust the resolving power balance of the focusing lens 24. The protruded portions 28b of the base plate 28a have a pair elongated holes 28f, respectively, which are extended in the directions of the arrow P2 perpendicular to the optical axis P1 (hereinafter referred to as "a perpendicular directions P2", when applicable). The elongated holes 28f are used as follows: That is, when the mounting plate 28 is secured to the coupling plate 29 with screws 28g, the latter 28g are inserted into the elongated holes 28f with a movable range in the directions of the arrow P2.

The coupling plate 29 is a steel plate formed by pressing. More specifically, the coupling plate 29 includes a base plate 29a, and a pair of first protruded portions 29b extended from the base plate 29a along the optical axis P1, and a pair of second protruded portions 29j extended from the base plate 29a in the directions of the arrow P2. The base plate 29a has screw holes 29c with which the aforementioned screws 28g are threadably engaged, a through-hole 29d for preventing the interference of the pin 27e with the coupling plate 29, and through-holes 29e for preventing the interference of the heads of the above-described tapping screws 24e with the coupling plate 29. The aforementioned screws 28g are inserted into the elongated holes 28f of the mounting plate 28 and threadably engaged with the screw holes 29c. Thus, with the aid of the movable range between the elongated holes 28f and the screws 28g, the mounting plate 28 is mounted on the coupling plate 29 in such a manner that it can be moved for adjustment of the optical axis of the focusing lens 27 (that is, it is movable in the perpendicular directions P2). A pair of elongated holes 29f are formed in the first protruded portion 29b of the coupling plate 29, respectively, which are extended in the direction of the optical axis P1. The elongated holes 29f are used as follows: That is, when the coupling plate 29 is secured to the base member 26 with the screws 29g, the latter 29g are inserted into the elongated holes 29f with clearances in the directions of the optical axis P1. The second protruded portions 29j have through-holes 29h to prevent the interference of the end portion of the screws 27g with the coupling plate 29.

The aforementioned base member 26 has a pair of screw holes 26c arranged in parallel with the optical axis P1 of the optical system 10. The above-described screws 29g are inserted into the elongated holes 29f and threadably engaged with the screw holes 26c. Thus, with the aid of the movable range between the elongated holes 29f and the screws 29g, the coupling plate 29 is mounted on the base plate 26 in such a manner that it is movable for adjustment of the length of the optical path of the focusing lens 24 (that is, it is movable along the optical axis P1).

With the holding mechanism thus constructed, the adjusting operations are carried out as follows: First, the base member 26 and the coupling plate 29 are adjusted in position to adjust the length of the optical path. Next, the holder 27 and the mounting plate 28 are adjusted in position to adjust the resolving power balance. Finally, the mounting plate 28 and the coupling plate are adjusted in position to correct the optical axis.

Figure 1B:
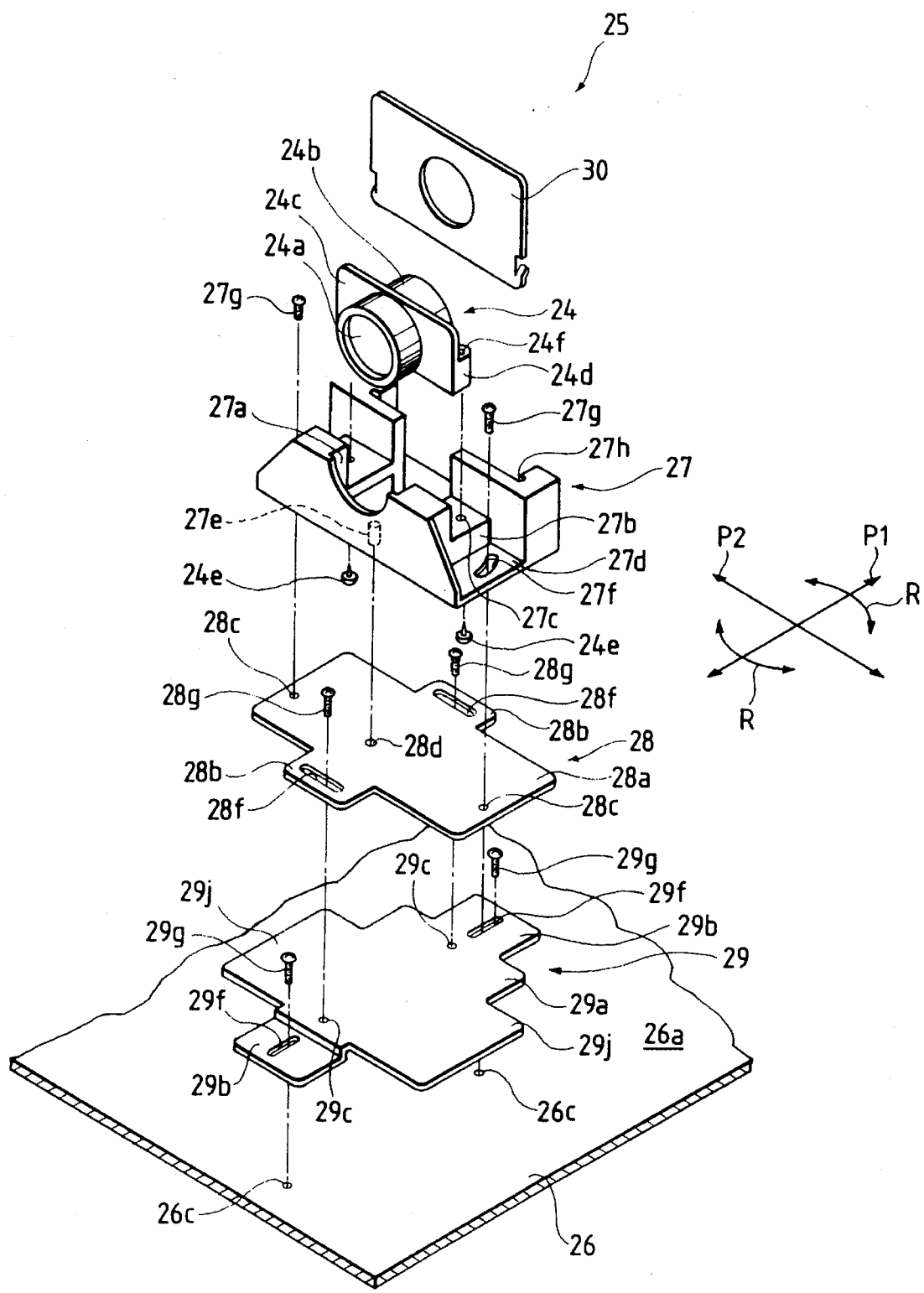

In the above mentioned holding mechanism, through-holes 28e and 29e for preventing the interference of the heads of the tapping screws 24e with the mounting plate 28 and the base plate 29, a through-hole 29d for preventing the interference of the pin 27e with the coupling plate 29, and through-holes 29h for preventing the interference of the end portion of the screws 27g with the coupling plate are provided, however these through-holes can be omitted (as shown in FIG. 1B) if the components, such as tapping screw 24e, pin 27e, screws 27g, holder 27, mounting plate 28 and coupling plate 29, are designed to not interfere with each other.

With the holding mechanism, the resolving power balance can be adjusted when the holder 27 is mounted on the mounting plate, and adjustment of the optical axis can be achieved when the mounting plate 28 is mounted on the coupling plate 29, and the length of the optical path of the focusing lens 24 can be adjusted while the coupling plate 29 is mounted on the base member 26 of the optical system. Hence, the adjusting operations for the focusing lens can be achieved independently of one another. Therefore, the components 26 through 29 of the holding mechanism can be manufactured with relatively low tolerances, and the yield rates of the components are increased as much; that is, the manufacturing cost is decreased as much.

The above-described holding mechanism 25 maybe applied to the so-called "clamshell type image forming apparatus". In this case, after installation of the optical system, the resolving power balance and the optical axis thereof may be deviated because dimensional errors are involved in coupling the upper and lower units to each other. However, with the holding mechanism, the optical system can be readily adjusted after installed, because the adjusting operations can be performed separately as was described above. That is, with the holding mechanism of the invention, the adjusting operations are achieved readily and quickly.

The invention has been described with reference to its preferred embodiment; however, it should be noted that the invention is not limited thereto or thereby. For instance, the holder 27 may be mounted on the mounting plate 28 in such a manner that the former is movable relative to the latter in the perpendicular directions P2, or in the directions of the optical axis P1, as the case may be. That is, the combinations of the members to be fixed, and the directions in which they are to be moved for adjustment may be selected freely. That is, in the embodiment, various changes and modifications may be made without departing from the invention.

With the focusing lens holding mechanism according to the invention, the adjusting operations for the focusing lens can be carried out separately. Therefore, the components of the holding mechanism can be manufactured with relatively low tolerances, and therefore the yield rates of the components are increased as much; that is, the manufacturing cost is decreased as much.

In the case where the holding mechanism of the invention is applied to the so-called "clamshell type image forming apparatus", after installation of the optical system, the resolving power balance and the optical axis thereof may be deviated because dimensional errors are involved in coupling the upper and lower units of the apparatus to each other. However, with the holding mechanism, the optical system can be readily adjusted after installed, because the adjusting operations can be performed separately as was described above. That is, with the holding mechanism of the invention, the adjusting operations are achieved readily and quickly.

What is claimed is:

1. A focusing lens holding mechanism for use in an optical system of a image forming apparatus, said holding mechanism comprising:

a holder for holding a focusing lens arranged on the optical axis of said optical system, said holder being mounted so as to be movable in a first direction;

a mounting plate on which said holder is mounted, said mounting plate being mounted so as to be movable in a second direction; and a coupling plate through which said mounting plate is coupled to a base member of said optical system, said coupling plate being mounted so as to be movable in a third direction;

wherein one of said first, second and third directions is to adjust a length of an optical path of said focusing lens, another of said three directions is to adjust a position of the optical axis of said focusing lens, and the remaining of said three directions is to adjust an inclination of said focusing lens so as to adjust a resolving power balance of said focusing lens, wherein said holder, mounting plate and coupling plate can be moved independently from each other.

2. A focusing lens holding mechanism as claimed in claim 1, wherein said first direction is perpendicular to said second direction, and said third direction is a direction of rotation in a plane defined by said first and second directions.

3. A focusing lens holding mechanism, for use in an optical system of a image forming apparatus, said holding mechanism comprising:

a holder for holding a focusing lens on an optical axis of said optical system, said holder being mounted so as to be movable in a first direction, said holder including:
   a holding portion for holding said focusing lens, and
   a first installation portion having a first opening therein, said first opening allowing for said holder to be mounted so as to be moveable in said first direction;

a mounting plate, on which said holder is mounted, said mounting plate being movable in a second direction, said mounting plate including:
   a first main plate portion for receiving said holder, and
   a second installation portion integrally formed with said first main plate portion, said second installation portion remaining exposed even when said holder is mounted on said mounting plate, said second installation portion having a second opening therein, said second opening allowing for said mounting plate to be mounted so as to be moveable in said second direction; and a coupling plate, through which said mounting plate is coupled to a base member of said optical system, said coupling plate being mounted so as to be movable in a third direction, said coupling plate including:
   a second main plate portion on which said mounting plate is placed, and
   a third installation portion integrally formed with said second main plate portion, said third installation portion remaining exposed even when said mounting plate is mounted to said coupling plate, said third installation portion having a third opening therein, said third opening allowing for said coupling plate to be mounted to said base member so as to be movable in a third direction;

wherein one of said first, second and third directions is to adjust a length of an optical path of said focusing lens, another of said three directions is to adjust a position of the optical axis of said focusing lens, and the remaining of said three directions is to adjust a inclination of said focusing lens so as to adjust a resolving power balance of said focusing lens, wherein said holder, mounting plate and coupling plate can be moved independently from each other.

4. A focusing lens holding mechanism as claimed in claim 3, wherein said first direction is perpendicular to said second direction, and said third direction is a direction of rotation in a plane defined by said first and second directions.

5. A focusing lens holding mechanism as claimed in claim 4, wherein said first, second and third installation portions include first and second sections, with said first and second sections of said first installation portion being symmetrically provided about said holding portion, said first and second sections of said second installation portion being symmetrically positioned about said first main plate portion, and said first and second sections of said third installation portion being symmetrically positioned about said second main plate portion.

6. A focusing lens holding mechanism as claimed in claim 5, wherein said base member has a plurality of screw holes arranged in parallel with the optical axis of said optical system, with said third opening of said coupling plate extending over said screw holes in said third direction so as to allow adjustment of the length of the optical path of said focusing lens.

7. A focusing lens holding mechanism as claimed in claim 3, further comprising:

a pin formed on said holder and extending in a downward vertical direction; and an insertion hole provided on said first main plate portion of said mounting plate for receiving said pin;

wherein said holder can be rotatably displaced around said pin so as to adjust an inclination of said focusing lens and resolving power balance of said focusing lens.

8. A focusing lens holding mechanism, for use in an optical system of a image forming apparatus, said holding mechanism comprising:

a holder for holding a focusing lens arranged on the optical axis of said optical system, said holder being mounted so as to be movable in a first direction;

a mounting plate on which said holder is mounted, said mounting plate being mounted so as to be movable in a second direction;

a coupling plate through which said mounting plate is coupled to a base member of said optical system, said coupling plate being mounted so as to be movable in a third direction; and a pin formed on one of said holder, mounting plate or coupling plate, said pin forming orientated in a vertical direction towards a photosensitive drum of said image forming apparatus, allowing for said one holder, mounting plate or coupling plate to be swingable about said pin;

wherein one of said first, second and third directions is to adjust a length of an optical path of said focusing lens, another of said three directions is to adjust a position of the optical axis of said focusing lens, and the remaining of said three directions is to adjust a inclination of said focusing lens so as to adjust a resolving power balance of said focusing lens, wherein said holder, mounting plate and coupling plate can be moved independently from each other.

* * * * *